United States Patent [19]
Priddy

[11] Patent Number: 4,725,021
[45] Date of Patent: Feb. 16, 1988

[54] INFLATABLE WING

[75] Inventor: Tommy G. Priddy, Albuquerque, N. Mex.

[73] Assignee: The United States of America as represented by the United States Department of Energy, Washington, D.C.

[21] Appl. No.: 919,995

[22] Filed: Oct. 17, 1986

[51] Int. Cl.⁴ .............................................. B64C 3/30
[52] U.S. Cl. ..................................... 244/123; 244/219
[58] Field of Search ..................... 244/34 R, 219, 218, 244/219 A, 100 A, 123, 124; 416/84

[56] References Cited

U.S. PATENT DOCUMENTS

| | | | |
|---|---|---|---|
| 2,056,188 | 10/1936 | Hayden | 244/218 |
| 2,616,509 | 11/1952 | Thomas | 244/218 |
| 2,642,883 | 6/1953 | Hasselquist | 135/1 |
| 2,749,061 | 6/1956 | Franz | 244/123 |
| 2,762,327 | 9/1956 | Weig | 116/63 |
| 3,074,232 | 1/1963 | Soyer | 244/219 A |
| 3,184,187 | 5/1965 | Isaac | 244/123 |
| 3,249,327 | 5/1966 | Smith | 244/123 |
| 3,305,196 | 2/1967 | Hanlon | 244/123 |
| 3,396,922 | 8/1968 | Windecker | 244/123 |
| 3,473,761 | 10/1969 | Chutter | 244/119 |
| 3,481,569 | 12/1969 | Bell | 244/123 |
| 3,484,788 | 12/1969 | Bell et al. | 343/880 |
| 3,957,232 | 5/1976 | Sebrell | 244/123 |

OTHER PUBLICATIONS

R. J. Oldfield, et al., "The Structural Behavior of Inflated Cantilever Beams", Report No. 260, Dept. of Aeronautical Eng., University of Bristol, Jun., 1981.

Primary Examiner—Joseph F. Peters, Jr.
Assistant Examiner—Rodney Corl
Attorney, Agent, or Firm—Anne D. Daniel; James H. Chafin; Judson R. Hightower

[57] ABSTRACT

An inflatable wing is formed from a pair of tapered, conical inflatable tubes in bonded tangential contact with each other. The tubes are further connected together by means of top and bottom reinforcement boards having corresponding longitudinal edges lying in the same central diametral plane passing through the associated tube. The reinforcement boards are made of a stiff reinforcement material, such as Kevlar, collapsible in a direction parallel to the spanwise wing axis upon deflation of the tubes. The stiff reinforcement material cooperates with the inflated tubes to impart structural I-beam characteristics to the composite structure for transferring inflation pressure-induced tensile stress from the tubes to the reinforcement boards. A plurality of rigid hoops shaped to provide airfoil definition are spaced from each other along the spanwise axis and are connected to the top and bottom reinforcement boards. Tension lines are employed for stabilizing the hoops along the trailing and leading edges thereof.

12 Claims, 5 Drawing Figures

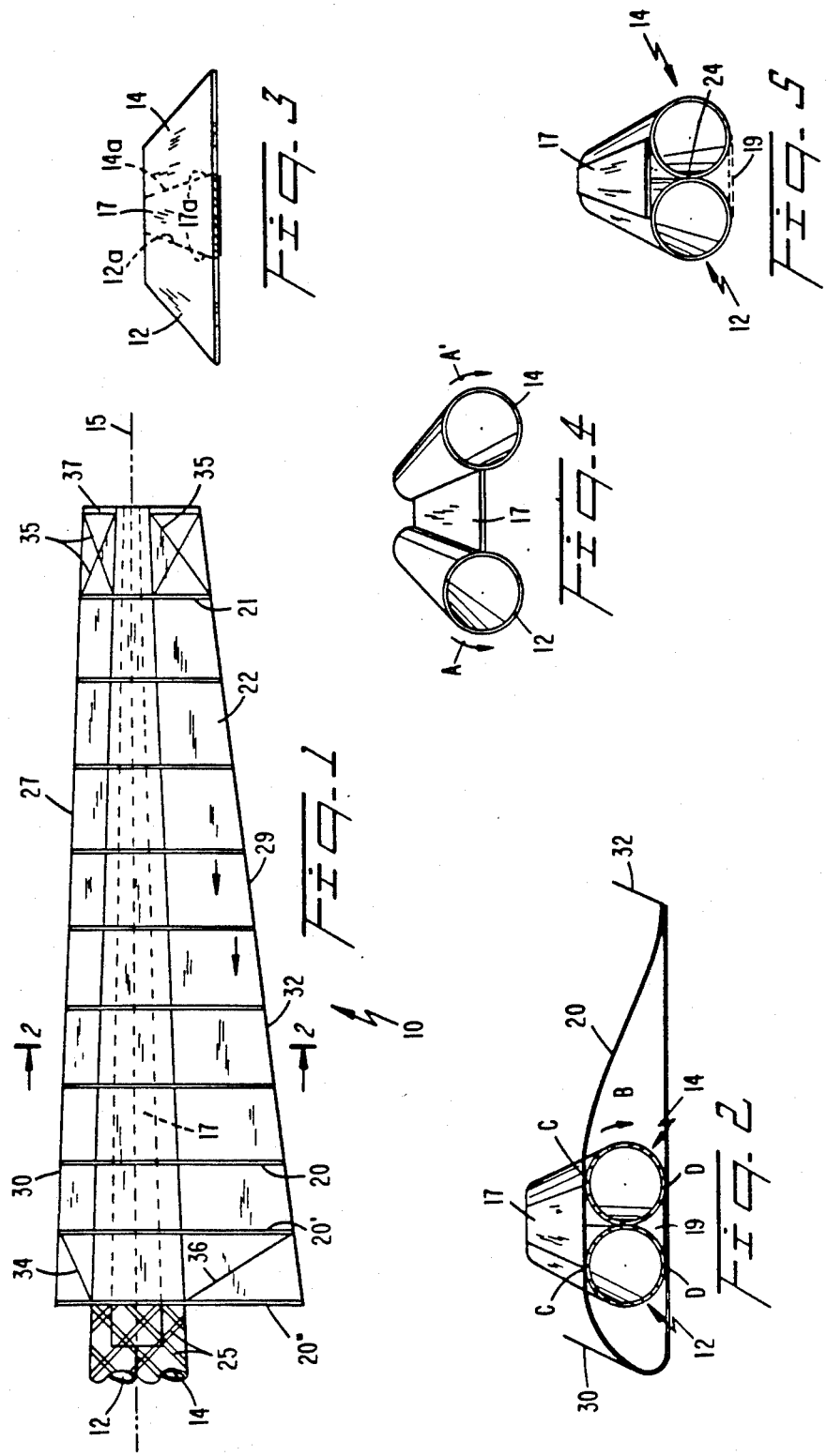

INFLATABLE WING

The U.S. Government has rights in this invention pursuant to Contract No. DE-ACO4-76DP00789 between the U.S. Department of Energy and AT&T Technologies, Inc.

BACKGROUND OF THE INVENTION

The present invention relates generally to inflatable structures and, more particularly to wings with inflatable aerodynamic surfaces.

Inflatable wings have been proposed for use in high altitude research vehicles as well as for use in lightweight aircraft where weight reduction is highly preferred. One such inflatable wing is disclosed in U.S. Pat. No. 3,957,232 wherein a wing structure is formed from a series of cylindrical pressure tubes which are inflatable to high pressure to deploy the structure from its stored, collapsed condition. Varying cylinder diameters yield aerodynamically curved surfaces which are covered with a thin collapsible material, such as Mylar ®, to define a smooth, taut wing surface.

The aforesaid and other prior art wings have numerous disadvantages, one such disadvantage being that the structural rigidity or resistance to bending during loading is dependent upon high inflation pressures. Maintenance of high pressure in such inflatable wing structures is difficult and becomes increasingly more difficult as the required pressure level increases.

Since the pressure tubes in the aforesaid prior art wing extend from the wing leading to trailing edge to define the airfoil profile, overall weight is unnecessarily increased. This weight problem is exacerbated by the fact that each individual pressure tube is of constant diameter along the spanwise axis, i.e., from the wing root to the wing tip, which I have found to be unnecessary from a structural standpoint since the wing behaves as a cantilever beam and therefore the bending moment (i.e., wing loading) progressively decreases from a maximum value at the root to zero at the tip.

It is accordingly one object of the present invention to provide an inflatable pressure aircraft wing capable of structural wing loading at relatively low inflation pressures.

Another object of the invention is to provide an inflatable wing with inflatable pressure tubes which are provided with stiff reinforcement materials for primary load bearing capability along the wing spanwise axis such that said reinforced inflatable pressure tubes behave structurally as an I-beam or a box beam.

Still a further object is to provide an inflatable tube arrangement with stiff reinforcement materials collapsible along the spanwise axis upon deflation of said tubes.

Yet another object is to provide an inflatable wing in which primary structural load bearing capability along the spanwise axis is provided by an inflatable I-beam-like construction of two attached inflatable tubes connected together by top and bottom reinforcement members collapsible in the spanwise direction.

Yet a further object is to provide an inflatable wing in which the tubes are conically tapered, having maximum diameters proximate the wing root where maximum loading occurs, and minimal diameters proximate the wing tip where wing loading is minimal, said conical tapered tubes resulting in reduced wing weight without loss of structural capability of the cantilevered wing configuration.

Yet another object is to provide an inflatable wing wherein the tubes are designed to resist torsional forces that may cause wing flutter during flight.

SUMMARY OF THE INVENTION

An inflatable aerodynamic wing structure, in accordance with the present invention, comprises an airfoil having at least two air-tight inflatable tubes made of a flexible material extending in a spanwise direction. The tubes extend generally parallel in tangential bonding contact with each other. Top and bottom collapsible reinforcement members are attached to upper and lower surfaces of the tubes to define an I-beam or box beam-like structure therewith, when said tubes are inflated for transfer of inflation pressure induced tensile stress from the tubes to the top and bottom reinforcement members. An airfoil outer surface provided by a flexible covering substantially entirely covers the tubes and reinforcement members.

Preferably, a plurality of lightweight rigid hoops, such as made of Kevlar-epoxy, are shaped to provide airfoil definition and spaced from each other along the spanwise axis extending generally perpendicular thereto. The inflatable tubes and top and bottom reinforcement members extend through the hoops and are fastened thereto through the top and bottom reinforcement members to define the inflatable wing covered with a collapsible material, such as Mylar ®, forming the airfoil outer surface. Upon deflation of the tubes, the rigid hoops are collapsible into each other for stacked inboard stowage within an aircraft fuselage.

The top and bottom reinforcement members may include a pair of generally flat members or boards made of stiff reinforcement material collapsible in a direction parallel to the spanwise axis upon deflation of the tubes. The material is preferably a stiff fabric, such as Kevlar. The top and bottom boards extend tangent to the tubes along the entire length of the wing.

More specifically, the top and bottom reinforcement boards each preferably have longitudinal edges bonded to the outer surface of the tubes, respectively, with corresponding edges of the top and bottom boards lying within the same central diametral plane passing through each associated tube to form the box beamlike structure. The airfoil defining hoops, which may be fiberglass, are then fastened to the top and bottom reinforcement boards.

A plurality of collapsible tension lines are preferably provided for connecting adjacent trailing ends of the hoops to each other and also for connecting adjacent leading ends of the hoops to each other. Additional tension lines connect the leading and trailing ends of the hoop adjacent the inboardmost hoop to the latter for stabilizing the hoops along the trailing and leading edges of the wing. The additional tension lines also connect the wing tip to the outermost hoop for stabilization and to prevent the wing from wrinkling during flight.

The pair of tubes are preferably conical tubes tapered in the direction of the wing tip to reduce overall weight. Thus, the maximum diameter of the tubes is proximate the wing root where bending moments are greatest.

A reinforcement tape may be wound diagonally about the tubes to increase torsional stiffness of the wing tending to prevent flutter during flight.

The top and bottom reinforcement members may be formed from a single length of stiff reinforcement material that is twice the length of the wing and collapsible in a direction perpendicular to the spanwise axis. In other words, during assembly, one-half of the reinforcement member is secured to extend above the tubes, defining the top reinforcement member, and is then wrapped around the ends of the tubes proximate the wing tip and then fastened to extend along the bottom of the tubes tangent to the tube material.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWING

FIG. 1 is a top plan view of an inflatable aircraft wing constructed in accordance with the present invention;

FIG. 2 is a sectional view taken along the line 2—2 of FIG. 1 depicting the structural cross-sectional configuration of the wing; and FIGS. 3-5 are perspective views sequentially depicting the manner in which the inflatable reinforced tubes of the invention are manufactured.

DETAILED DESCRIPTION OF THE INVENTION

FIG. 1 is an illustration of inflatable wing 10 of the invention preferably comprising two cylinders 12 and 14 constructed of air-tight flexible fabric (e.g., nylon) extending generally parallel to spanwise axis 15 the full length of the wing. Cylinders 12,14 are connected together in the unique manner discussed below via strategic placement of top and bottom reinforcement members 17 and 19 to provide primary wing load bearing capability. The cylinders 12,14 connected by reinforcement members 17,19 (e.g., 1000 lb. Kevlar cloth), when inflated, generally possess the load bearing characteristics of a prestressed structural I-beam or box beam, as discussed infra, and extend through a plurality of lightweight rigid hoops 20 positioned at spaced intervals along spanwise axis 15 to impart airfoil definition to wing 10. An outer collapsible covering 22, such as Mylar ®, forms a taut, smooth airfoil outer surface about the aforementioned parts when cylinders 12,14 are inflated.

FIG. 2 depicts the cross-sectional relationship of the inflatable tubes to the airfoil outer surface as defined by the hoop structure, where the cross-sectional area of the tubes is very much smaller than the cross-sectional area of the airfoil outer surface. This structural arrangement contributes to the reduction of overall weight of the wing.

FIGS. 3-5 depict the manner in which cylinders 12,14 are attached to top and bottom reinforcement members 17,19 to form the aforementioned structural box beam construction. Initially, the cylinders 12,14 (FIG. 3 deflated) are positioned generally parallel to each other on a flat surface (not shown) so that adjacent longitudinal edges 12a,14a contact corresponding edges of top reinforcement member 17, respectively. Reinforcement member 17 is preferably fabricated from stiff fabric, such as Kevlar, collapsible in the spanwise direction towards the aircraft fuselage (not shown) upon inflation or deflation of wing 10. The longitudinal edges 17a of top reinforcement member 17 are glued to edges 12a,14a of the deflated cylinders.

Next, with reference to FIG. 4, cylinders 12,14 are partially inflated and then rotated downwardly in the direction of arrows A,A', respectively, until the cylinders are in tangential contact with each other as at 24. Cylinders 12,14 are glued at 24 preferably along their entire length with a continuous glue line (not shown in detail). Bottom reinforcement member 19 is then fixed to the underside of cylinders 12,14 preferably with continuous glue lines as in the case of top reinforcement 17. If desired, the resulting structural box beam construction depicted in FIG. 5 may be diagonally wrapped with tape 25, such as fiberglass tape, in crisscross fashion as depicted in FIG. 1 only. The tape 25 imparts torsional stiffness to cylinders 12,14 so that, during flight, they resist the tendency of twisting in the direction of arrow B which may possibly cause wing flutter.

It will be appreciated that the manner in which cylinders 12,14 and reinforcement members 17,19 connect together, when inflated, result in the basic geometry of a structural I-beam by virtue of the abutting tangency of the cylinders with each other (at 24) and with the reinforcement members establishing uppermost and lowermost spanwise tangent lines C and D parallel to each other and extending perpendicular to a flat plane passing through the tangential point of contact of the cylinders with each other. In other words, the structural capability of inflated cylinders 12,14 makes use of stiff reinforcement layers 17,19 to approximately double the stabilizing effects of the pressure in the cylinders since the structural capability is controlled by the pressure-induced tensile stress and its spatial distribution, i.e., the axial thrust from the pressure in the aforesaid box or I-beam type structure is forced from the inflated cylinders into the stiff reinforcement layers 17,19 which are placed at a maximum perpendicular distance from the centers of the cylinders, this particular placement assisting in providing the desired I-beam effect. That is, for a given pressure, the bending moment of cylinders 12,14 at crippling is theoretically doubled by the reinforcement members and high inflation pressures are not solely relied upon as in the aforementioned prior art structures for achieving structural integrity.

Based upon experimentation, it has been discovered that an aircraft wing manufactured with the aforesaid strategic placement of stiff reinforcement members 17,19 requires inflation pressures of only about 50% of that required for inflation cylinders disclosed in the aforesaid prior art without reinforcement materials to obtain the same structural strength. Further, by providing a structure which does not depend solely on high inflation air pressures for its necessary structural capability, lower air inflation pressures may be advantageously employed minimizing the danger normally associated with the prior art structures upon loss of air pressure.

Airfoil defining hoops 20 (FIG. 2) are essentially rigid structures preferably made of fiberglass, Kevlar-epoxy or other lightweight materials. Hoops 20 are positioned at spaced intervals from each other along spanwise axis 15 so that they extend perpendicular to the spanwise axis establishing leading and trailing edges 27,29 of the wing. The dimensions of hoops 20 are shown to decrease as a function of decreasing distance from the fuselage to obtain the wing plan configuration depicted in FIG. 1. Each hoop 20 is preferably secured to the outer surfaces of top and bottom reinforcement members 17,19 utilizing glue or possibly tape 25.

Tension lines 30 and 32 are secured to each hoop 20 to extend respectively along the leading and trailing edges 27,29 for stabilizing the hoops. Tension lines 34,36 are also provided for connecting the hoop 20' immediately adjacent the inboardmost hoop 20" for stabilizing effect. Tension lines 35 as depicted in FIG. 1 assist in stabilizing the wing tip areas by connecting wing tip molding 37 (fixed to the outermost end of cylinders 12,14) to the outermost hoop 21 adjacent the wing tip molding.

In accordance with an important feature of the present invention, cylinders 12,14 are conically tapered to have their maximum diameters proximate the wing root and minimum diameters (or tapered points) in the vicinity of the wing tips. Since a wing essentially behaves as a cantilever beam, bending moments and wing loading are greatest proximate the wing root and progressively decrease to zero at the wing tip. Thus, the structural capability of wing 10 is not compromised by the use of tapered, conical cylinders 12,14 and which advantageously reduce overall weight of the wing in relation to constant diameter pressure cylinders as taught in the prior art.

Upon deflation, it will be appreciated that all aforementioned structural wing materials are capable of collapsing along spanwise axis 15 for stacked inboard stowage within the aircraft fuselage. Hoops 20 are translated towards the fuselage during the stowage process and 'stack' within each other to occupy minimum space.

The attachment of the inboardmost hoop 20" and the innermost end of cylinders 12,14 to the fuselage is conventional and known to one of ordinary skill in the art upon review of the present disclosure. Similarly, connection of appropriate inflation equipment to cylinders 12,14 of the invention through a manifold is well known.

The foregoing description of a preferred embodiment of the present invention has been presented for purposes of illustration and description. It is not intended to be exhaustive or to limit the invention to the precise form disclosed, and obviously many modifications and variations are possible in light of the above teachings. The embodiment was chosen and described in order to best explain the principles of the invention and its practicable application to thereby enable others skilled in the art to best utilize the invention and various embodiments and with various modifications as are suited to the particular use contemplated. It is intended that the scope of the invention be defined by the claims appended hereto.

What is claimed is:

1. An inflatable aerodynamic wing structure, comprising:
   (a) an airfoil having at least two air-tight inflatable tubular enclosure means made of a first flexible material and extending along a spanwise axis;
   (b) top and bottom reinforcement member means made of a second stiff fabric material and connecting said at least two air-tight inflatable tubular enclosure means together for transfer of inflation pressure-induced tensile stress from said enclosure means to said top and bottom reinforcement member means;
   (c) a plurality of rigid hoops shaped to provide airfoil definition and spaced from each other along the spanwise axis and extending generally perpendicular thereto, said air-tight inflatable tubular enclosure means extending through said airfoil definition hoops and fastened thereto through said top and bottom reinforcement member means, said rigid hoops collapsing into each other for stacked stowage upon deflation of said enclosure means; and
   (d) means for forming an airfoil outer surface, made of a third thin, flexible and collapsible material, about substantially said entire tubular enclosure means and said top and bottom reinforcement member means, such that the area of a cross-section of said tubular enclosure means is much smaller than the area of a cross-section of said airfoil outer surface.

2. The wing structure of claim 1, wherein said top and bottom reinforcement member means includes a pair of generally flat boards made of said second stiff fabric reinforcement material and collapsible in a direction parallel to the spanwise axis upon deflation of said enclosure means.

3. The wing structure of claim 2, wherein said top and bottom boards extend generally the entire length of said wing tangent to said tubular enclosure means.

4. The wing structure of claim 3, wherein said tubular enclosure means includes a pair of tubes bonded together in tangential contact with each other; and said top and bottom reinforcement boards each have longitudinal edges bonded tangentially to said tubes, respectively, with corresponding edges of said top and bottom boards lying within the same vertical diametral plane passing through each tube.

5. The wing structure of claim 4, wherein said hoops are fastened to said top and bottom boards.

6. The wing structure of claim 5, further including a plurality of collapsible tension lines for connecting adjacent trailing ends of said hoops to each other and for connecting adjacent leading ends of said hoops to each other.

7. The wing structure of claim 6, further including auxiliary tension line means for connecting leading and trailing ends of the hoop adjacent the inboardmost hoop to the latter for stabilizing said hoops along the trailing and leading edges of the wing, said auxiliary tension line means also connecting the wing tip to the outermost hoop adjacent thereto.

8. The wing structure of claim 1, wherein said second stiff fabric material is Kevlar.

9. The wing structure of claim 1, wherein said at least two air-tight inflatable tubular enclosure means include a pair of tapered conical tubes tapered in the direction of the wing tip to reduce overall weight.

10. The wing structure of claim 1, further including a reinforcement tape wound diagonally about said tubular enclosure means to increase torsional stiffness of the wing to prevent flutter.

11. The wing structure of claim 1, wherein said hoops are made of Kevlar-epoxy.

12. The wing structure of claim 1, wherein said top and bottom reinforcement member means is formed from a single length of stiff reinforcement material twice the length of the wing and collapsible in a direction perpendicular to the spanwise axis.

* * * * *